United States Patent [19]
Paielli

[11] 3,776,573
[45] Dec. 4, 1973

[54] LOAD TRANSFERRING COUPLING DEVICE

[76] Inventor: Michael F. Paielli, 12360 Roberts, Taylor, Mich. 48180

[22] Filed: Oct. 4, 1972

[21] Appl. No.: 294,977

[52] U.S. Cl. ............................................ 280/405 A
[51] Int. Cl. ............................................ B62d 53/00
[58] Field of Search .................... 280/405 A, 406 R

[56] References Cited
UNITED STATES PATENTS

| | | | |
|---|---|---|---|
| 2,727,755 | 12/1955 | Hume | 280/405 A |
| 2,847,230 | 8/1958 | Hendrickson | 280/406 R |
| 2,941,818 | 9/1960 | Hubbard | 280/405 A |
| 2,996,312 | 8/1961 | Harding | 280/405 A |
| 3,227,470 | 1/1966 | Funk | 280/405 A |
| 3,363,914 | 1/1968 | Neel | 280/405 A |
| 3,494,632 | 2/1970 | Bostrom | 280/405 A X |
| 3,580,609 | 5/1971 | Paielli | 280/405 A |

*Primary Examiner*—Leo Friaglia
*Attorney*—Adolph G. Martin

[57] ABSTRACT

A coupling device for connecting tractor and trailer units which consists of a pivoted coupling member having associated therewith a pivoted flat member supported in the plane of the coupling member by two inflatable air bags mounted on the tractor. The air bags are connected into the compressed air system of the tractor through a control valve manipulable to change the pressure in the air bags so as to vary the upward thrust on the pivoted flat member and thereby distribute the load in the trailer in a pre-selected manner over the trailer and tractor axles, thereby greatly improving the riding quality of the tractor and simultaneously correcting any mis-loading of the trailer.

6 Claims, 10 Drawing Figures

PATENTED DEC 4 1973 3,776,573
SHEET 1 OF 2
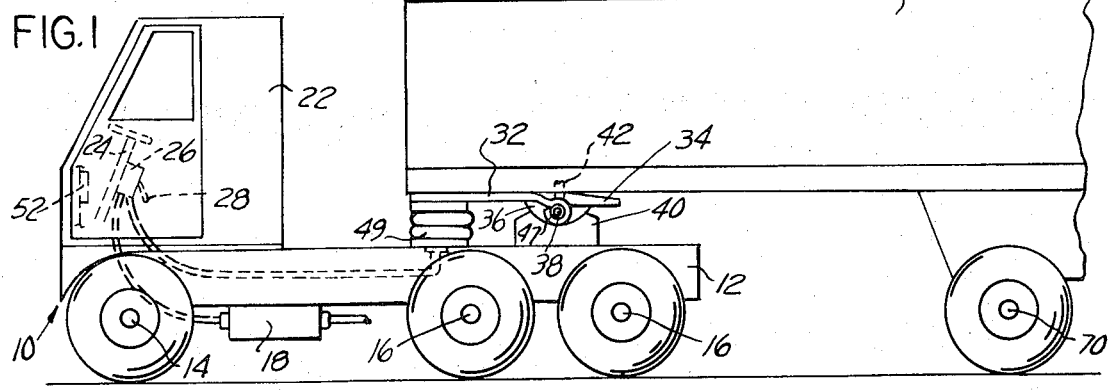
FIG.1
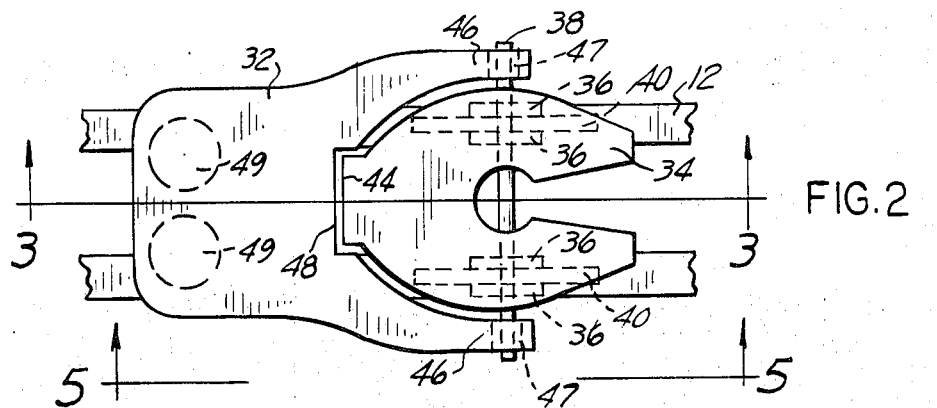
FIG.2
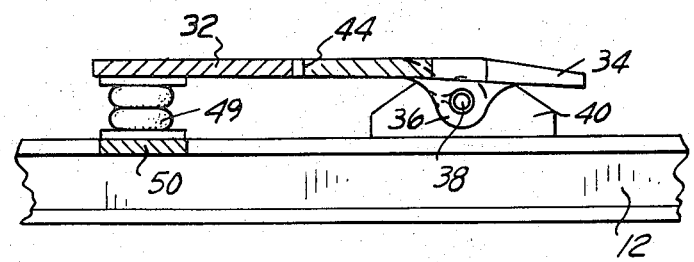
FIG.3
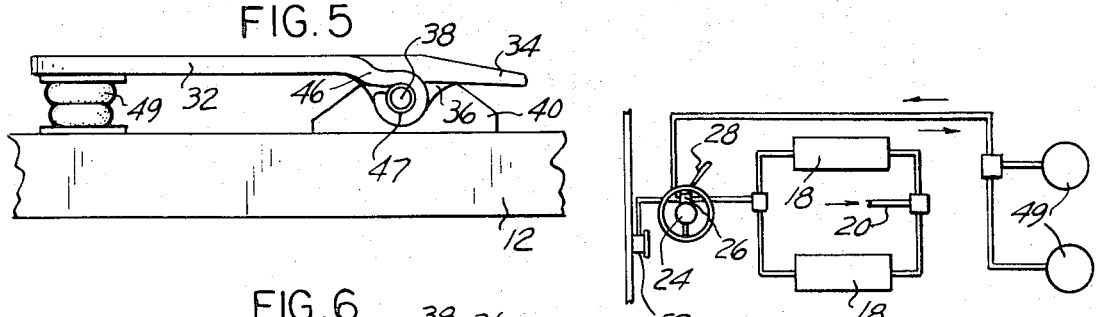
FIG.5
FIG.6
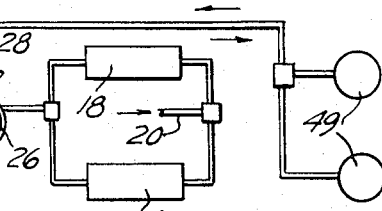
FIG.4

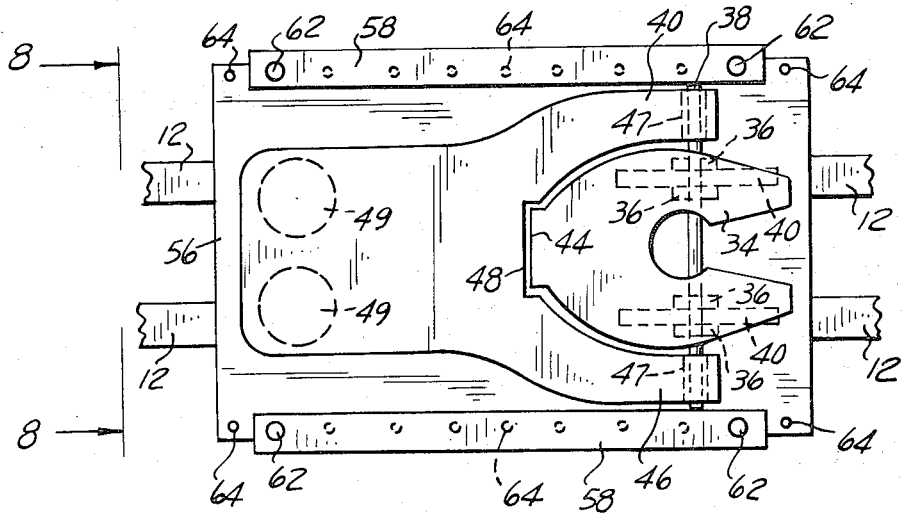
FIG. 7
FIG. 8
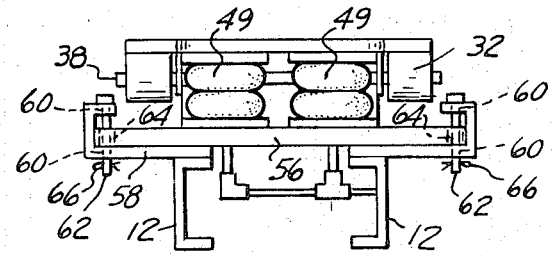
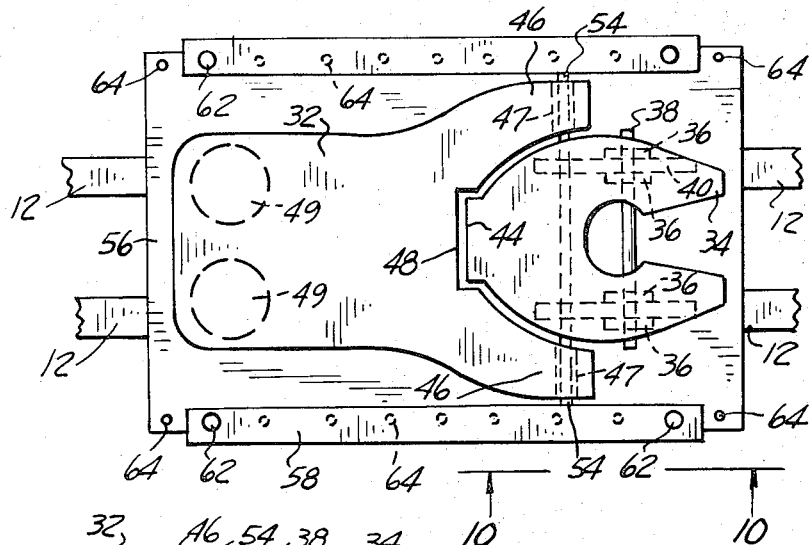
FIG. 9
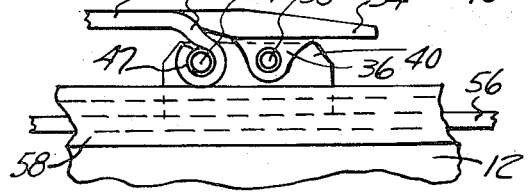
FIG. 10

3,776,573

LOAD TRANSFERRING COUPLING DEVICE

BACKGROUND OF THE INVENTION

This invention relates to coupling devices generally for connecting tractor and trailer units, and more particularly to an improvement over the previously issued patent of the applicant, U.S. Pat. No. 3,580,609, issued May 25, 1971, and entitled "Fifth Wheel with Load-Transferring Device." The relative movement between tractor and trailer units which occurs during hauling operations produces severe stresses in the various components of such coupling devices. The applicant, fully cognizant of this situation, has provided a load transferring coupling device which will permit a limited amount of relative movement between the tractor and trailer frames without subjecting the coupling device to dangerous stresses.

SUMMARY OF THE INVENTION

This invention consists of a coupling device comprising a coupling member 34 pivotally supported by spaced brackets 40 mounted on the frame 12 of the tractor 10. A pivoted flat member 32 is supported in the plane of the coupling member 34 by a pair of inflatable air bags 49 mounted on the tractor 10. The inflatable air bags 49 are connected to the compressed air tanks 18 of the tractor 10, and controlled by a valve 26 manipulable from the cab 22 of the tractor 10. In the modification disclosed in FIGS. 7 through 10 of the drawings, the coupling member 34, the flat member 32 and the inflatable air bags 49 are all mounted on a longitudinally adjustable lateral plate 56 supported by the frame 12 of the tractor 10.

BRIEF DESCRIPTION OF THE DRAWINGS

FIG. 1 is a fragmentary side elevation view, showing tractor and trailer units 10 and 30 respectively, connected by a coupling device embodying the applicant's invention.

FIG. 2 is an enlarged plan view of the coupling device detached from the tractor 10, showing structural details of the invention.

FIG. 3 is an enlarged section view, taken substantially on plane 3—3 in FIG. 2, showing the brackets 40 and the inflatable air bags 49 supporting the coupling device.

FIG. 4 is a schematic view, showing the inflatable bags 49, and the control valve 26 connected into the pneumatic circuit of the tractor 10.

FIG. 5 is an enlarged side elevation view, taken substantially on plane 5—5 in FIG. 2, showing the characteristic shape of the flat member 32.

FIG. 6 is an enlarged side elevation view, similar to FIG. 5, showing a modification of the applicant's invention.

FIG. 7 is an enlarged plan view, showing the lateral plate 56 in a further modification of the applicant's invention.

FIG. 8 is an enlarged view, taken substantially on plane 8—8 in FIG. 7, showing the channel members 58 and the locking pins 62.

FIG. 9 is an enlarged elevation view, similar to FIG. 7, showing another modification of the applicant's invention.

FIG. 10 is an enlarged side elevation view, taken substantially on plane 10—10 in FIG. 9, showing the bracket 40 on the lateral plate 56 pivotally supporting the coupling device.

CONSTRUCTION

For a more detailed description of the invention, reference is made to the drawings in which numeral 10 designates a tractor having a frame 12 supported on a steering axle 14 and a pair of drive axles 16. Two compressed air storage tanks 18, supported by the frame 12, are connected by a tubular conductor 20 to a compressor, not shown, in the customary manner.

A cab 22 on the tractor frame 12 has therein a steering column 24 supporting a control valve 26 having an operator lever 28, as shown in FIGS. 1 and 4. A coupling device for connecting the tractor 10 to a trailer 30, comprises a flat member 32 and a coupling member 34. The coupling member 34, has on the lower side thereof two pairs of dependent lugs 36 pivotally engaged on a transverse pintle 38 supported by two spaced brackets 40 mounted on the frame 12 of the tractor 10.

The coupling member 34 has a central opening therethrough for holdably receiving a coupling element or king pin 42 on the trailer 30 for connecting it to the tractor 10 in the customary manner, as shown in FIG. 1. A lateraly disposed tongue 44 is provided on the forward end of the coupling member 34. A rearwardly extending leg 46, on each side of the flat member 32, is pivotally attached to the pintle 38, through a resilient bushing 47. A slot 48 is provided on the rear end of the flat member 32 for receiving the tongue 44 of the coupling member 34.

A pair of vertically disposed inflatable air bags 49, mounted on a cross member 50 of the frame 12, support the forward end of the flat member 32, and hold it in a substantially horizontal position. The pair of inflatable air bags 49 are connected to the compressed air storage tanks 18 through the control valve 26 in the cab 22 of the tractor 10, as shown in FIGS. 1 and 4. A pressure gauge 52, on the instrument panel of the cab 22 of the tractor 10, is connected to the control valve 26, as shown in the schematic drawing of FIG. 4, so as to indicate the pressure in the inflatable air bags 49.

The modification of the applicant's invention, disclosed in FIG. 6 of the drawings, differs from the embodiment shown in FIGS. 1 through 5 in that the rearwardly extending legs 46 on the flat member 32 are pivotally connected to a separate pintle 54 supported by the spaced brackets 40. All other significant structural features of this modification are identical to those of the embodiment disclosed in FIGS. 1 through 5, and previously discussed in detail; consequently, they will not again be described.

The modification of the applicant's invention, disclosed in FIGS. 7 and 8 of the drawings, differs from the embodiments shown in FIGS. 1 through 6 in that the two spaced brackets 40, supporting the pintles 38 and the pair of inflatable air bags 49, are mounted on a lateral plate 56 slidably supported on two spaced inwardly disposed channel members 58 mounted on the frame 12 of the tractor 10.

Vertically aligned openings 60, through each end of the inwardly disposed channel members 58, have therein removable bolts 62 which pass through spaced openings 64 provided in the plate 56. Cotter pins 66, through the lower end of each bolt 62, secures them in place so as to hold the plate 56 in its assigned position on the tractor 10.

The modification disclosed in FIGS. 9 and 10 of the drawings, differs from the embodiment shown in FIGS. 7 and 8, in that the rearwardly extending legs 46 on the flat member 32 are pivotally connected to a separate pintle 54 supported by the spaced brackets 40. All other significant structural features of this modification are identical to the embodiment disclosed in FIGS. 7 and 8 and previously discussed in detail; consequently, they will not again be described.

The preceding discussion completes a description of the structural details relating to the applicant's invention herein disclosed. However, to facilitate a more thorough and complete understanding of the subject matter, a discussion is immediately hereinafter direced to the manner in which the coupling device operates, and is used to accomplish its intended function.

OPERATION

In use, the tractor 10 is connected in the customary manner to a trailer 30, which is then loaded and driven to a weighing device. In operating the embodiments disclosed in FIGS. 1 through 6 of the drawings, the operator lever 28 on the control valve 26 is manipulated so as to inflate the air bags 49 sufficiently to distribute the load in the desired manner over the tractor and trailer axles.

It is thus possible to comply with the legal requirements relating to load distribution over the steering, drive and trailer axles 14, 16, and 70 respectively, without physically shifting the load in the trailer 30. To deflate the air bags 49, when the same are not needed, the operator lever 28 is positioned so that the air bags 49 discharge to the atmosphere through the control valve 26.

In using the modifications of the applicant's invention disclosed in FIGS. 7 through 10 of the drawings, the driver can also shift the coupling device longitudinally on the tractor 10 to assist in distributing the load over the tractor and trailer axles 14, 16 and 70 respectively. This is done by first removing the four bolts 62 from the channel members 48 to unlock the lateral plate 56.

The lateral plate 56 can then be shifted longitudinally on the tractor 10 so as to move the point of attachment for the trailer relative to the steering and drive axles 14 and 16 respectively. The four bolts 62 are then reinserted through the channel members 58 and the lateral plate 56 thereby again locking the latter in its assigned position on the tractor 10.

Based upon the foregoing discussion, the applicant is of the opinion that his invention has fulfilled a long-felt need in the field of coupling devices for tractor and trailer units, and that he has accordingly made a valuable and significant contribution to the related art. However, while the invention was described with reference to the structural details of a limited number of embodiments, it will be appreciated by those familiar with the art that the principles involved are susceptible of numerous other practical adaptations.

I therefore claim as new, and desire to secure by Letters Patent:

1. A load transferring coupling device for connecting tractor and trailer units, wherein the tractor unit has a frame supported on steering and drive axles and the trailer unit has at least one axle and a coupling element, such coupling device comprising a coupling member for holdably engaging the coupling element on the trailer, a flat member having therein a rearwardly disposed slot, a tongue on the forward end of the coupling member engaged in the slot so as to prevent any appreciable relative lateral movement between the coupling member and the flat member, pivotal means on the tractor supporting the coupling member and the flat member, at least one inflatable air bag on the tractor for exerting an upward thrust on the flat member, and means for controllably inflating the air bag so as to distribute the load in the trailer in a pre-selected manner over the steering, drive and trailer axles.

2. The load transferring coupling device of claim 1 in which the pivotal means comprises spaced brackets mounted on the frame of the tractor, and a transverse laterally disposed pintle supported by the brackets and pivotally attached to the coupling member and the flat member.

3. The load transferring coupling device of claim 1 in which the pivotal means comprises spaced brackets mounted on the frame of the tractor, and a pair of transverse laterally disposed pintles supported by the spaced brackets, one of such pintles being pivotally attached to the coupling member, and the other of such pintles being pivotally attached to the flat member.

4. The load transferring coupling device of claim 1, having in addition thereto: a lateral plate adjustably mounted on the frame of the tractor, such lateral plate supporting the pivotal means so that the coupling member and the flat member can be simultaneously shifted longitudinally on the tractor so as to assist in distributing the load in the trailer over the tractor and trailer axles.

5. The load transferring coupling device of claim 4 in which the pivotal means comprises spaced brackets mounted on the lateral plate, and a transverse laterally disposed pintle supported by the spaced brackets and pivotally attached to the coupling member and the flat member.

6. The load transferring coupling device of claim 4 in which the pivotal means comprises spaced brackets mounted on the lateral plate, and a pair of transverse laterally disposed pintles supported by the spaced brackets, one of such pintles being pivotally attached to the coupling member, and the other of such pintles being pivotally attached to the flat member.

* * * * *